(12) United States Patent
Simmons

(10) Patent No.: US 6,818,124 B1
(45) Date of Patent: Nov. 16, 2004

(54) RESERVOIR MANAGEMENT SYSTEM

(75) Inventor: Brent Simmons, Palo Alto, CA (US)

(73) Assignee: Severn Trent Water Purification, Inc., Colmar, PA (US)

( * ) Notice: Subject to any disclaimer, the term of this patent is extended or adjusted under 35 U.S.C. 154(b) by 31 days.

(21) Appl. No.: 09/951,183

(22) Filed: Sep. 13, 2001

Related U.S. Application Data

(60) Provisional application No. 60/287,997, filed on May 1, 2001.

(51) Int. Cl.[7] .................................................. C02F 1/00
(52) U.S. Cl. ..................... 210/153; 210/198.1; 210/205
(58) Field of Search ............................. 210/153, 198.1, 210/205, 232; 405/303

(56) References Cited

U.S. PATENT DOCUMENTS 4,033,704 A * 7/1977 Wadge et al.
6,488,401 B1 * 12/2002 Seaman
6,533,496 B1 * 3/2003 Elliot

* cited by examiner

*Primary Examiner*—Betsey Morrison Hoey
(74) *Attorney, Agent, or Firm*—D'Ambrosio & Associates, P.L.L.C.; Jo Katherine D'Ambrosio

(57) ABSTRACT

A system, method, and apparatus for managing a water supply in a water tank are presented herein. A submersible pump is placed inside the water tank. The thrust of the pump causes a considerable increase in water circulation about the water tank, thereby resulting in a more consistent water supply. Chemical disinfectants are added directly in front of the pump, thereby resulting in better mixing. Additionally an outlet from the pump provides a testable sample for measurement of the concentration of the chemical disinfectant. The measurements of the concentration of the chemical disinfectant are provided to a programmable logic controller which makes real time adjustments to the chemical disinfectants that are added.

15 Claims, 4 Drawing Sheets

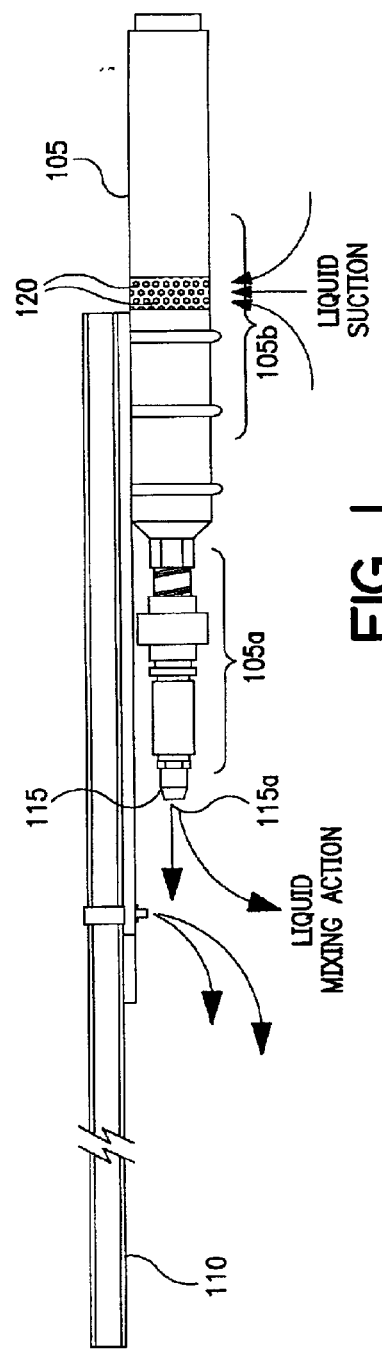
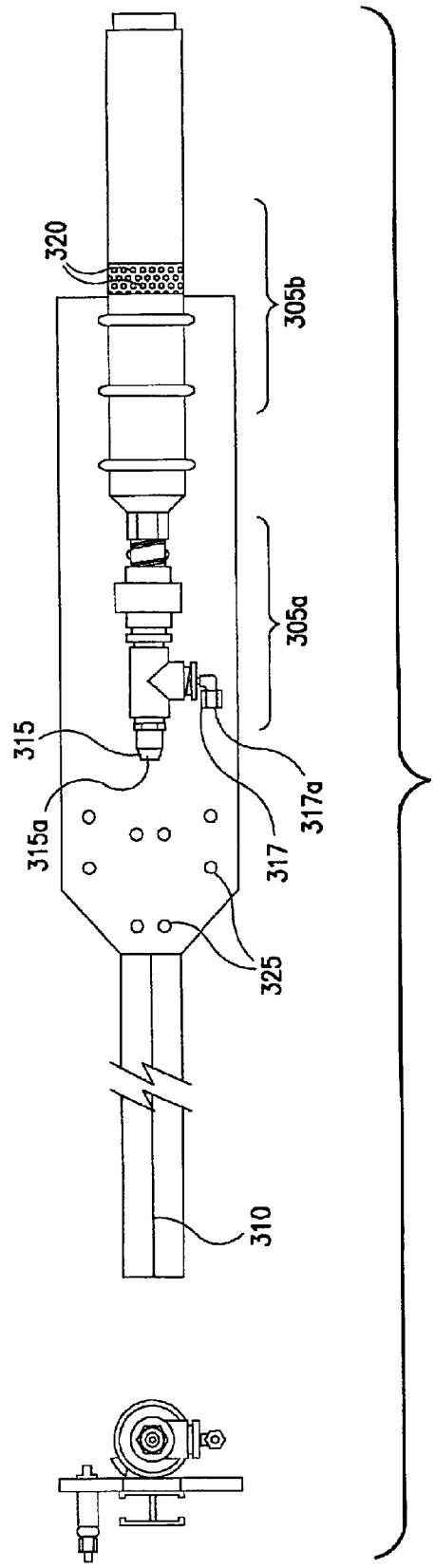

RESERVOIR MANAGEMENT SYSTEM

PRIORITY DATA

This application claims priority from Provisional Application for Patent Ser. No. 60/287,997, entitled "Reservoir Management System with Ammonia Containment System", filed May 1, 2001 by Brent Simmons which hereby incorporated by reference for all purposes.

FIELD

The present invention is directed to water distribution systems, and more specifically to a reservoir management system.

BACKGROUND

A commonly used municipal water distribution system includes large water tanks that are often placed at a high geographical point, such as the top of a hill. Pipes are connected to the bottom of the water tank and are run downwards and distributed throughout the municipalities for usage by the population. The downward force of the water in the tank creates pressure that distributes the water through the distribution network. As the water is used downhill, fresh water is pumped into a section of the pipe near the bottom of the tank. In this manner, the water pressure is maintained.

Use of a large water tank in such a manner is also advantageous because the water in the tank serves as a reserve for use during periods of high demand. Water tanks can contain as much a 4 million gallons of water and are as large as 200 feet in diameter and 40 feet in height. The water flow rate or replacement rate is comparatively small to the volume of water in the tank.

It is an objective of a water distribution system to distribute water that is consistent in quality, and composition. However, a major drawback of water distribution systems using a large tank is that the added water fails to mix with the reserved water. Thereby, the reserved water has a tendency to remain in the water tank, while most of the added water flows downward for usage. The reserved water remains in the tank until periods of high demand, wherein the level of the water in the tank is reduced.

The stagnation of the water in the tank causes inconsistencies between the distributed water and the reserved water. Stagnant water in the tank is exposed to the outside temperature for a longer period of time, typically causing the water temperature to increase, particularly during the summer in the sun belt states.

Additionally, disinfectant chemicals used to preserve the water break down after certain periods of time and heat. Therefore, the effectiveness of the disinfectant chemicals reduces in the stagnant water. During the periods of high demand when the reserved water is finally used, there is the potential danger that the quality of the water may be unsuitable for consumption.

Accordingly, it would be beneficial if a consistent water quality can be obtained.

SUMMARY

Presented herein is a system, method, and apparatus for maintaining the quality of water held in a storage tank. A submesible pump is placed towards the bottom of the storage tank in proximity to fresh water that is added. The thrust of the submersible pump results in amplified fluid motion causing better mixing in the storage tank with a relatively lower pumping power. Additionally, injection fixtures are provided for injection of chemical disinfectants in a manner that also results in better mixing.

BRIEF DESCRIPTION OF THE DRAWINGS

FIG. 1 is a block diagram of an exemplary storage tank mixing apparatus;

FIG. 3 is a block diagram of another exemplary storage tank mixing apparatus;

DETAILED DESCRIPTION OF THE DRAWINGS

Figure 2:
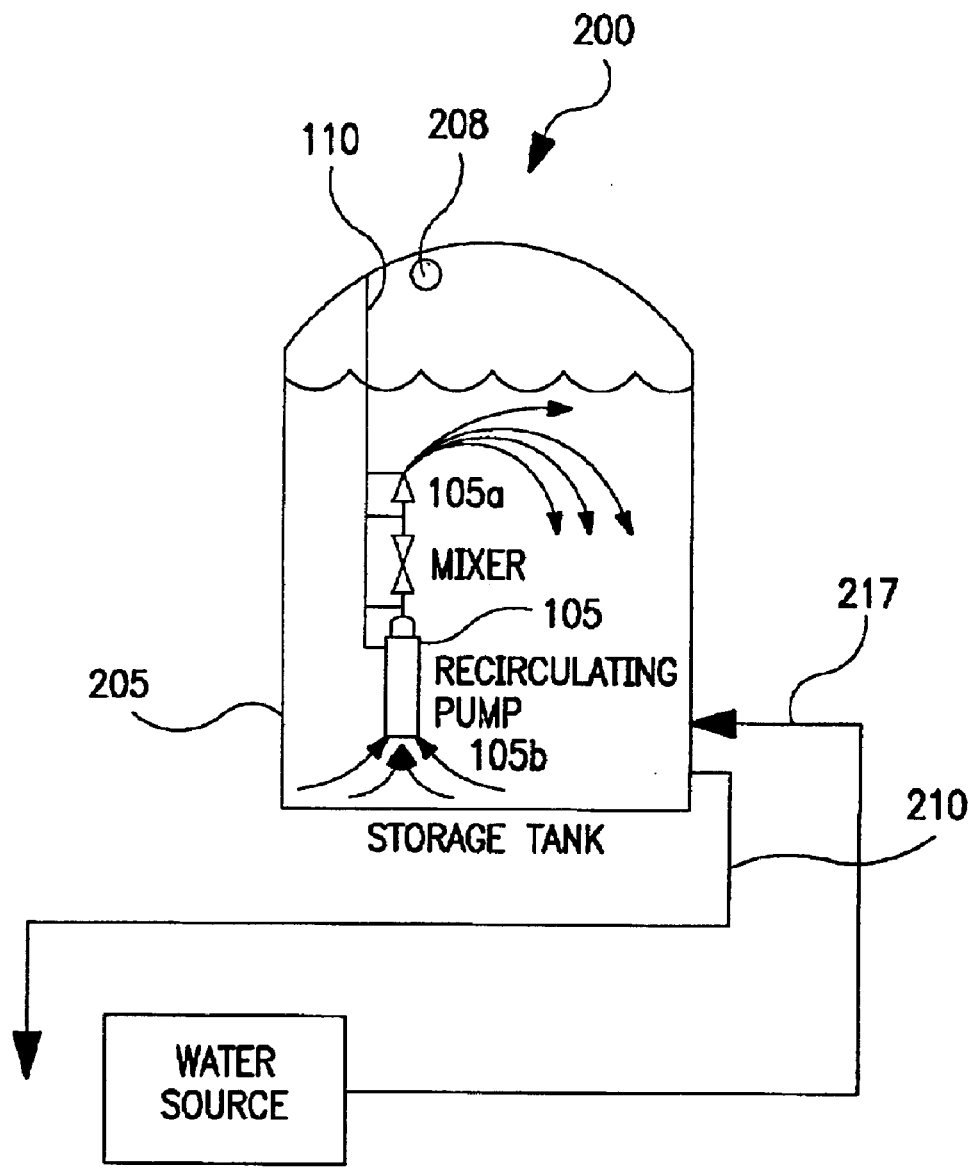
FIG. 2 is a block diagram of an exemplary water supply system.

Referring now to FIG. 1, there is illustrated a block diagram of an exemplary storage tank mixing apparatus, referred to generally by the numeric reference 100. The storage tank mixing apparatus includes a submersible pump 105 attached, to a strut 110. The submersible pump 105 is shaped generally like a tube and includes a discharge 105a and an intake 105b. The strut 110 is generally parallel to the direction of the submersible pump 105 and extends in the direction of the discharge 105a.

Attached to the discharge 105a is a plumbing assembly 112. The plumbing assembly 112 comprises a short nipple 112a attached to and surrounding the discharge 105a. A union 112b is attached to the short nipple 112a, followed by reducer bushing 112c, and pipe length 112d. A nozzle 115 is connected to pipe length 112d of the plumbing assembly 112. The nozzle 115 includes an opening 115a which is preferably smaller in relation to the diameter of the submersible pump 105. The intake portion of the submersible pump 105 includes perforations 120 to filter and permit entry of fluid inside the submersible pump 105.

The submersible pump 105 is operable to produce a thrust from the intake region 105b in the direction of the discharge region 105a, through the plumbing assembly, and out of the nozzle opening 115a. The foregoing thrust causes fluid motion from the region surrounding the perforations in the direction of the discharge region 105b and through the nozzle 115. Additionally, the thrust causes a region of low pressure to form in the vicinity and adjacent to the nozzle 115. The region of low pressure causes significant fluid movement in the vicinity of the submersible pump 105 in addition to the particle movement through the nozzle 115. This additional fluid movement can amplify the fluid movement rate due the thrust, by a factor of 5 or more.

Referring now to FIG. 2, there is illustrated a block diagram describing an exemplary water supply system 200. The water supply system includes a large water tank 205 that can be placed at a high geographical point, such as the top of a hill. Pipes 210 are connected towards the bottom of the water tank 205 and are run downwards and distributed throughout the municipalities for usage by the population. The downward force of the water in the tank 205 creates pressure that distributes the water through the distribution network. As the water is used downhill, fresh water is received from a water source 215 into a pipe 217 and transported into the water tank 205.

In an exemplary embodiment, the water tank 205 can contain as much a 4 million gallons of water and is approximately 200 feet in diameter and 40 feet in height. The water tank 205 contains therein the storage tank mixing apparatus 100 positioned towards the bottom of the water tank 205. The storage tank mixing apparatus 100 is configured such that the intake region 105b is facing downwards while the discharge region 105a is facing upwards. The submersible pump 105 is affixed by strut 110 extending from the top of the tank near a manhole 208.

During operation of the submersible pump 105, an upward thrust from the intake region 105b in the direction of the discharge region 105a through the nozzle is created. The upward thrust causes water to be suctioned through the perforations 120 and thrust out of the nozzle 115. Additionally, the thrust causes a region of low pressure to form in the vicinity and adjacent to the nozzle 115. The region of low pressure causes significant water movement in the vicinity of the submersible pump 105 in addition to the water movement through the nozzle 115. This additional water movement can amplify the water movement rate due to the thrust, by a factor of 5 or more.

Referring now to FIG. 3, there is illustrated a block diagram of a second exemplary storage tank mixing apparatus, referred to generally by the numeric reference 300. The storage tank mixing apparatus includes a submersible pump 305 attached to a strut 310. The submersible pump 305 is shaped generally like a tube and includes a discharge 305a and an intake 305b. The strut 310 is generally parallel to the direction of the submersible pump 305 and extends in the direction of the discharge region 305a.

The plumbing assembly 312 comprises a short nipple 312a attached to and surrounding discharge 305a. A union 312b is attached to the short nipple 312a followed by reducer bushing 312c and a T 312d. The T 312d has one end which extends in a direction perpendicular to the plumbing assembly 312 and submersible pump 305 and another end which is along the direction of the plumbing assembly 312 and submersible pump 305. A sampling line 317 is connected to the T 312d at the end which is perpendicular to plumbing assembly 312 and submersible pump 305. The sampling line includes reducing bushing 317a, an elbow 317b, and compression nut 317c. Connected to the end of the T 312d which extends along the direction of the plumbing assembly 312 and submersible pump 305 is a nozzle 315. The nozzle 315 includes an opening 315a which is preferably smaller in relation to the diameter of the submersible pump 305. The compression nut 317c of sampling line 317 facilitates connection of a sampling pipe for taking a particle sample to testing apparatus. The intake of the submersible pump 305 includes perforations 320 to filter and permits entry of fluid inside the submersible pump 305.

The submersible pump 305 is operable to produce a thrust from the intake 305b in the direction of the discharge region 305a in a manner well known in the art. The foregoing thrust causes fluid motion from the region surrounding the perforations in the direction of the discharge region 305b and through the nozzle 315. A portion of the particle motion is received at the sampling valve 317 as well.

Additionally, the thrust causes a region of low pressure to form in the vicinity and adjacent to the nozzle 315. The region of low pressure causes significant particle movement in the vicinity of the submersible pump 305 in addition to the particle movement through the nozzle 315. This additional particle movement amplifies the particle movement rate due the thrust.

The strut 310 also includes a plurality of injection fixtures for affixing additive injectors. The injection fixtures 325 are located in proximity to the nozzle 315 in the direction of the thrust. The placement of the injection fixtures 325 in such a manner is advantageous for several reasons. Placement of the fixtures 325 in proximity to the nozzle 315 facilitates addition of additives directly into the region of maximum fluid movement, causing a higher level of mixing. Additionally, the higher level of mixing results in a high level of dilution, thereby substantially preventing precipitates from forming. Furthermore, to the extent that any precipitates form, the mechanical force of the fluid movement prevents deposits from forming on the injection fixtures 325.

Figure 4:
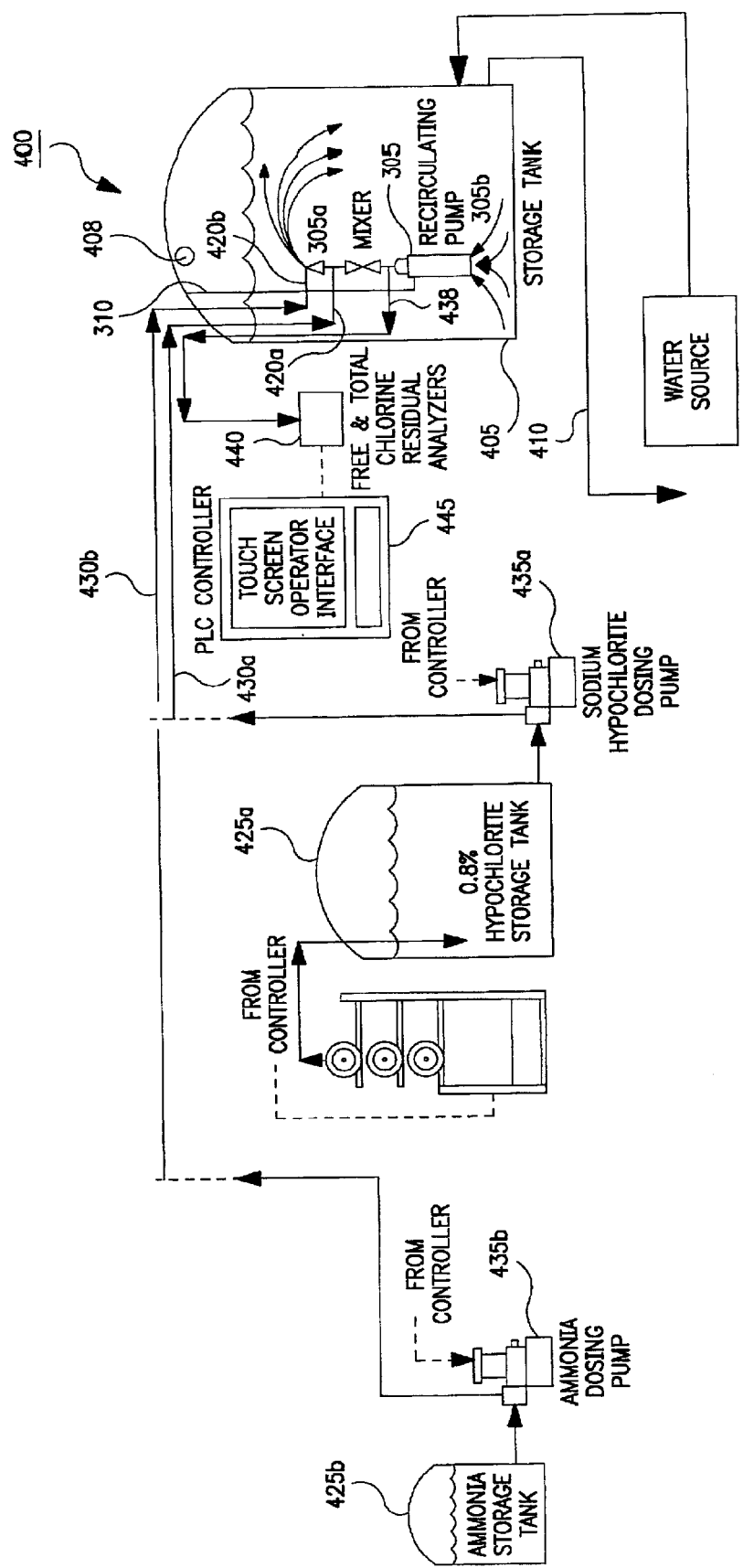
FIG. 4 is a block diagram of another exemplary water supply system.

Referring now to FIG. 4, there is illustrated a block diagram of a reservoir management system, referenced generally by the numeric reference 400. Pipes 410 are connected towards the bottom of a water tank 405 and are run downwards and distributed throughout the municipalities for usage by the population. The downward force of the water in the tank 405 creates pressure that distributes the water through the distribution network. As the water is used by the municipalities, additional water is pumped through the pipes 410 replacing the used water.

In an exemplary embodiment, the water tank 405 can contain as much a 4 million gallons of water and is approximately 200 feet in diameter and 40 feet in height. The water tank 405 contains therein the storage tank mixing apparatus 300 positioned towards the bottom of the water tank 405. The storage tank mixing apparatus 300 is configured such that the intake region 305b is facing downwards with respect to the tank, while the discharge region 305a is facing upwards. The submersible pump 305 is affixed by strut 310 extending from the top of the tank near a manhole 408.

A first chemical disinfectant 420a is received from a first chemical disinfectant supply 425a by a pipe 430a which injects the first chemical disinfectant 420a into the water supply via injection fixture 325. A second chemical disinfectant 420b is received from a second chemical disinfectant supply 425b by a pipe 430b which injects the second chemical disinfectant 420b into the water supply via another injection fixture 325. The concentrations of the first and second chemical disinfectants 420a, 420b are controlled by dosing pumps 435a, 435b.

In one embodiment, the first chemical disinfectant can comprise ammonia while the second chemical disinfectant can comprise a chlorine source, such as a 0.8% hypochlorite solution. Additionally, the ammonia can be added from an injection fixture 325, and the chlorine can be added from another injection fixture 325, wherein the injection fixture 325 for adding the ammonia is closer to the nozzle 315 than the fixture 325 for adding the chlorine. The foregoing significantly reduces formation of chlorinated organic materials.

During operation of the submersible pump 305, an upward thrust from the intake region 305b in the direction of the discharge region 305a through the nozzle is created. The upward thrust causes water to be suctioned through the perforations 320 and thrust out of the nozzle 315. Additionally, the thrust causes a region of low pressure to form in the vicinity and adjacent to the nozzle 315. The region of low pressure causes significant water movement in the vicinity of the submersible pump 305 in addition to the water movement through the nozzle 315. This additional water movement amplifies the water movement rate due to the thrust. Additionally, as cooler and heavier water from the bottom is thrust upward, the cooler and heavier water falls faster causing better mixing of the disinfectants and the reserved water. A testable quantity 438 of the water in the water tank 405 is pumped out of the sampling line 317. The testable quantity of the water 438 is received by analysis equipment 440 which measures the chemical disinfectant 420a, 420b concentration in the water 421. Due to the high water movement in the tank, the testable quantity of water is pumped with sufficient force to transfer the water to a fairly remote location. The water is returned to the water tanks 405 via a return pipe 438b. Accordingly, the analysis equipment 440 can be located remotely from the tank 405. The ability to place the analysis equipment 440 at a remote location permits centralized control of several sparsely located water tanks 405. The measurements are received by a programmable logic controller 445. The programmable logic controller 445 can be programmed to maintain the chemical disinfectant 420a, 420b of the water in the storage tank 400 at predetermined levels by controlling the dosing pumps 430a, 430b.

In one embodiment, the analysis equipment 440 measures the total chlorine and the free chlorine in the testable quantity of water 438. Based on the difference between the free chlorine and the total chlorine, the programmable logic controller 445 determines the amount of chloroamines. Based on the measured chlorine and the chloroamines, the programmable logic controller 445 can determine whether a malfunction is preventing appropriate amounts of chemical disinfectants 425a, 425b from being added. For example, wherein an excessive amount of chloroamines are measured as compared to the free chlorine, the foregoing is indicative of lower levels of the hypochlorite solution. On the other hand, wherein an excessive amount of free chlorine is measured as compared to the chloroamines, the foregoing is indicative of lower levels of the ammonia. Responsive to detecting an imbalance of the chemical disinfectants 425a, 425b, the programmable logic controller 445 can either set an alarm to warn the operator or take remedial actions, such as increasing the frequency that a particular dosing pump 430a, 430b applies the chemical disinfectant 425a, 425b.

Figure 5:
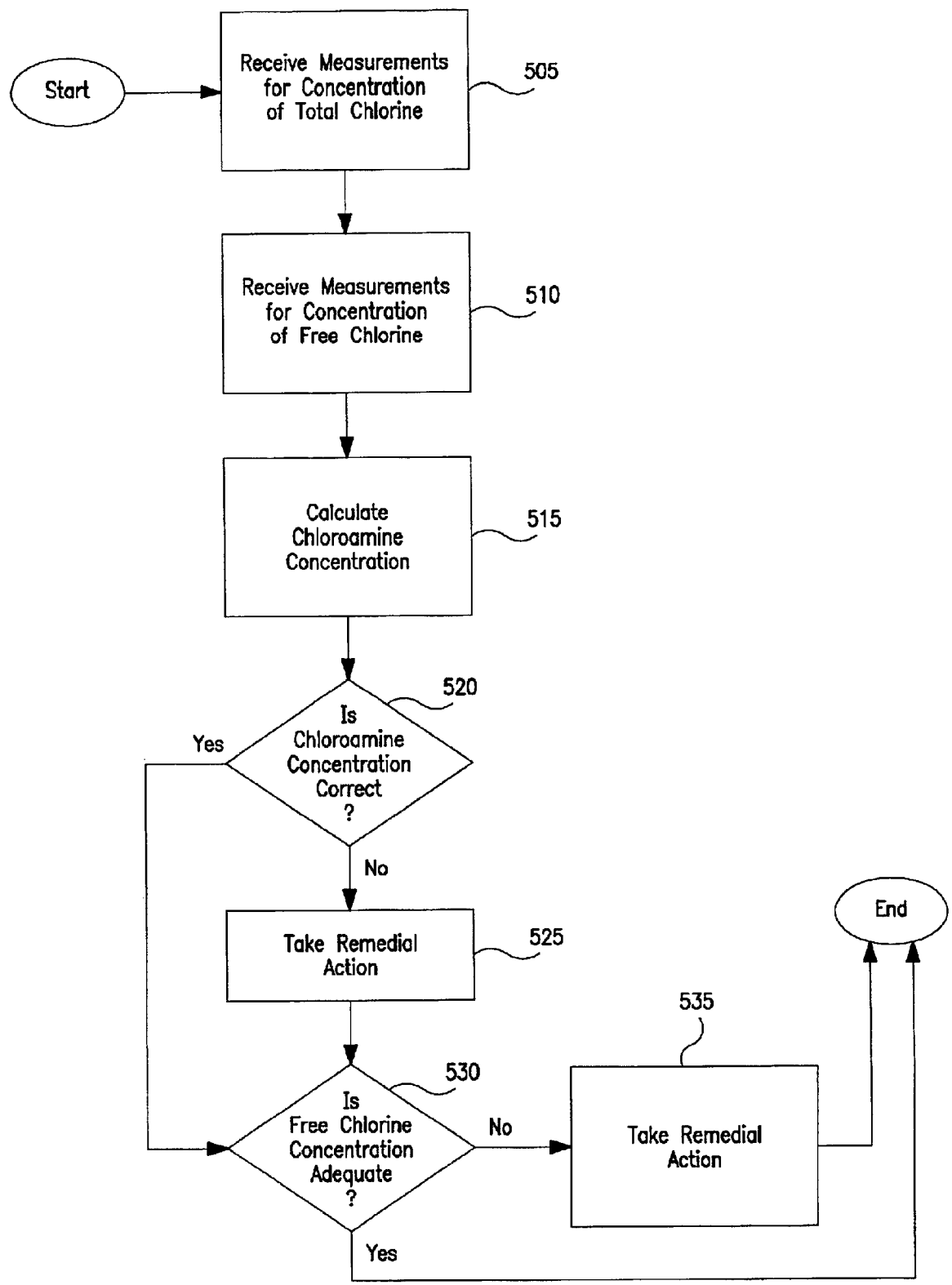
FIG. 5 is a flow diagram describing the operation of the programmable logic controller.

Referring now to FIG. 5, there is illustrated a flow diagram describing the operation of the programmable logic controller 445. At step 505, the programmable logic controller 445 receives measurements for the concentration of the total chlorine and the measurements for the amount of free chlorine (step 510). At step 515, the programmable logic controller calculates the amount of chloroamines by taking the difference between the measurements for the total chlorine and the free chlorine.

The measurement for the chloroamine is compared to the predetermined concentration at step 520. Wherein the measurements are not substantially equivalent to the predetermined concentration, the programmable logic controller 445 takes remedial action (step 525) with respect to the ammonia. The remedial action can comprise, for example, setting an alarm indicative of a malfunction with the ammonia or increasing the frequency that the dosing pump associated with the ammonia adds the ammonia.

The measurement for the free chlorine is compared to a predetermined concentration at step 530. Wherein the measurements are not substantially equivalent to the predetermined concentration, the programmable logic controller 445 takes remedial action (step 535) with respect to the hypochlorite. The remedial action can comprise, for example, setting an alarm indicative of a malfunction with the hypochlorite or increasing the frequency that the dosing pump associated with the hypochlorite adds the hypochlorite.

The foregoing systems, methods, and apparatus advantageously provide a large quantity of water which is homogenous with respect to tank contents and chemical residual. Homogenuity with respect to tank contents and chemical residual permits usage of the entire tank volume in warm climates.

Although the foregoing detailed description describes certain embodiment with a degree of specificity, it is noted that the modifications, and substitutions can be made to the embodiments without departing from the spirit and scope of the present invention. Accordingly, the present invention is limited only by the claims and equivalents thereof.

What is claimed is:

1. An apparatus for mixing water, said apparatus comprising:

a submersible pump comprising a discharge region;

a strut connected to the submersible pump and extending in the direction of a nozzle; and an injection fixture connected to the strut.

2. The apparatus of claim 1, wherein the injection fixture is connected to the strut near the nozzle of the submersible pump.

3. The apparatus of claim 1, further comprising:

a second injection fixture connected to the strut.

4. The apparatus of claim 1, wherein the discharge region further comprises:

a nozzle; and a sampling valve.

5. The apparatus of claim 1, further comprising:

an injector connected to the injection fixture.

6. The apparatus of claim 1, wherein the submersible pump further comprises:

an intake region comprising a plurality of perforations.

7. A fluid containment system for supplying fluid, said fluid containment system further comprising:

a tank for storing the fluid;

a submersible pump for moving the fluid from an intake region to a discharge region;

a strut for affixing the submersible pump in the tank; and a first injection fixture for injecting a first chemical disinfectant into the fluid at the discharge region.

8. The fluid system of claim 7, further comprising:

a first chemical disinfectant system for supplying a chemical disinfectant to the first injection fixture.

9. The fluid system of claim 8, further comprising:

a second injection fixture for injecting a second chemical disinfectant to the fluid; and a second chemical disinfectant supply system for supplying a second chemical disinfectant to the second injection fixture.

10. The fluid system of claim 9, wherein the first chemical disinfectant supply system supplies ammonia, and wherein the second chemical disinfectant supply system supplies chlorine, and wherein the first injection fixture is closer to the submersible pump than the second injection fixture.

11. The fluid system of claim 7, further comprising:

a sampling valve for extracting a testable sample of the fluid from the tank.

12. The fluid system of claim 11, further comprising:

a return pipe for returning the testable sample to the tank.

13. The fluid system of claim 11, further comprising:
measurement equipment for measuring the concentration of the first chemical disinfectant in the testable sample of the fluid.

14. The fluid system of claim 13, further comprising:
a programmable logic controller for adjusting the amount of the first chemical disinfectant added by the first chemical disinfectant supply system, responsive to the measurement equipment measuring the concentration of the first chemical disinfectant in the testable sample of the fluid.

15. The fluid system of claim 14, wherein the programmable logic controller adjusts the amount of a chemical disinfectant that is added to a second tank.

* * * * *